(12) United States Patent
Fukui et al.

(10) Patent No.: US 8,001,251 B2
(45) Date of Patent: Aug. 16, 2011

(54) AV SERVER

(75) Inventors: Takayuki Fukui, Osaka (JP); Monta Nakatsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 486 days.

(21) Appl. No.: 11/792,929

(22) PCT Filed: Jan. 19, 2006

(86) PCT No.: PCT/JP2006/000757
§ 371 (c)(1),
(2), (4) Date: Jun. 13, 2007

(87) PCT Pub. No.: WO2006/077935
PCT Pub. Date: Jul. 27, 2006

(65) Prior Publication Data
US 2007/0260678 A1    Nov. 8, 2007

(30) Foreign Application Priority Data
Jan. 21, 2005 (JP) .................................. 2005-014789

(51) Int. Cl.
*G06F 15/16* (2006.01)
*G06F 17/30* (2006.01)
(52) U.S. Cl. .......................................... 709/227; 726/29
(58) Field of Classification Search ................... 709/227
See application file for complete search history.

(56) References Cited

U.S. PATENT DOCUMENTS

| | | | |
|---|---|---|---|
| 5,652,749 A * | 7/1997 | Davenport et al. | 370/466 |
| 5,835,724 A * | 11/1998 | Smith | 709/227 |
| 5,867,494 A * | 2/1999 | Krishnaswamy et al. | 370/352 |
| 6,987,768 B1 * | 1/2006 | Kojima et al. | 370/401 |
| 7,293,084 B1 * | 11/2007 | Kenmochi | 709/224 |
| 7,681,244 B2 * | 3/2010 | Morioka et al. | 726/29 |
| 2002/0046241 A1 | 4/2002 | Nomura et al. | |
| 2002/0073210 A1 * | 6/2002 | Low et al. | 709/228 |

(Continued)

FOREIGN PATENT DOCUMENTS

EP  1 187 473  3/2002

(Continued)

OTHER PUBLICATIONS

Supplementary European Search Report (in English language) issued Nov. 4, 2008 in International Application No. PCT/JP2006/300757.

(Continued)

*Primary Examiner* — Aaron Strange
*Assistant Examiner* — James Edwards
(74) *Attorney, Agent, or Firm* — Wenderoth, Lind & Ponack, L.L.P.

(57) ABSTRACT

There is provided an AV server capable of internally establishing a logical connection and appropriately managing connection with a plurality of client devices even when a physical connection is firstly requested from a client device. The AV server includes a communication unit which communicates with the client device via a communication channel; a protocol processing unit which performs processes including retrieval of a UPnP AV-compliant device and capability exchange based on the logical connection; a content data accumulation unit which accumulates content data such as a recorded TV program, moving image data and still image data therein; a content data distribution unit which distributes the content data accumulated in the content data accumulation unit; and a connection management unit which manages HTTP connection session information based on the physical connection for distributing the content data.

20 Claims, 13 Drawing Sheets

U.S. PATENT DOCUMENTS

| | | | |
|---|---|---|---|
| 2002/0104025 A1* | 8/2002 | Wrench, Jr. | 713/202 |
| 2002/0124074 A1* | 9/2002 | Levy et al. | 709/224 |
| 2003/0217369 A1* | 11/2003 | Heredia | 725/152 |
| 2004/0019681 A1* | 1/2004 | Nakamura et al. | 709/226 |
| 2004/0221163 A1* | 11/2004 | Jorgensen et al. | 713/182 |
| 2005/0262343 A1* | 11/2005 | Jorgensen et al. | 713/168 |
| 2009/0109959 A1* | 4/2009 | Elliott et al. | 370/352 |

FOREIGN PATENT DOCUMENTS

| | | |
|---|---|---|
| JP | 2001-084200 | 3/2001 |
| JP | 2002-84484 | 3/2002 |
| JP | 2002-328851 | 11/2002 |
| JP | 2004-348454 | 12/2004 |
| WO | 00/59230 | 10/2000 |

OTHER PUBLICATIONS

Ritchie, J., et al. *"UPnP AV Architecture: 0.83"*, Design Document Microsoft, XX, XX, Jun. 12, 2002, pp. 1-22, XP002271673.

* cited by examiner

```
<item id="Episode 1" parentID="Drama" restricted="0">
<upnp:class>object.item.videoItem</upnp:class>
<upnp:writeStatus>PROTECTED</upnp:writeStatus>
<dc:title> Episode 1 Wallace's appearance </dc:title>
<res protocolInfo="http-get:*:video/mpeg:*" duration="00:58:00">
    http://192.168.0.1/HDD/drama_01.mpg
</res>
<upnp:channelName> National broadcasting station </upnp:channelName>
<dc:date>2005-01-19T21:00:00</dc:date>
</item>
```

| | Connection IDs | PFC establishment destinations | HTTP distribution destinations | Services | priorities |
|---|---|---|---|---|---|
| 1 | 5 | 192.168.0.2 | 192.168.0.2 | TV | 1 |
| 2 | 0 | — | 192.168.0.3 | VOD | 2 |
| 3 | 6 | 192.168.0.4 | 192.168.0.6 | TV | 3 |
| 4 | 0 | 192.168.0.5 | 192.168.0.5 | VOD | 4 |
| 5 | | | | | |

| IP addresses | priorities |
|---|---|
| 192.168.0.2 (Father) | 1 |
| 192.168.0.3 (Mother) | 2 |
| 192.168.0.6 (Brother) | 3 |
| 192.168.0.5 (Sister) | 4 |

AV SERVER

TECHNICAL FIELD

The present invention relates to an AV server which distributes AV content such as music or moving images to a client device via a home network or the like, and particularly to an AV server which sends AV content to a plurality of client devices at-home.

BACKGROUND ART

In recent years, with the expansion of broadband environments such as xDSL and an optical-fiber telecommunications system, Internet connection services have increasingly become available both for business use and for home use. A home network environment, which connects an at-home personal computer (PC) and an electric appliance via Ethernet (registered trademark), wireless LAN or the like, has also become familiar. Reflecting such a situation, it has become possible to connect not only PCs, but also home electric appliances such as a television, a DVD recorder, an air conditioner, and a refrigerator, to each other with an IP (Internet Protocol) defined by IETF (Internet Engineering Task Force).

As an application for the Internet and a home network, there are applications used for making AV content such as music and moving image available between electric appliances/PCs/an electric appliance and a PC. For example, such applications provide an AV streaming function for making the broadcast program recorded in a DVD recorder available with a TV, a PC, or the like which are connected to a network.

As a protocol for performing such an AV streaming, typically, HTTP (Hyper Text Transfer Protocol) defined by RFC2616, RTP (Real-time Transport Protocol) defined by RFC1889, and the like have been available. HTTP, in particular, ensures transfer reliability by the resending function of TCP (Transmission Control Protocol). Specifically, TCP includes a procedure for detecting a packet error to resend the packet received in error, and a procedure for detecting a packet loss to resend the lost packet, which ensures reliable file transfer even when an error or a packet loss occurs on a transmission channel.

In a network environment where a transmission error tends to occur, its throughput characteristically becomes lower due to data retransmission. TCP, therefore, is suitable for the AV streaming under the environment where an error or a packet loss tends to occur on a transmission channel, such as a home network. TCP is a basic AV streaming method for standards such as UPnP AV (Universal Plug and Play Audio/Video Architecture) and DLNA (Digital Living Network Alliance).

The AV streaming with HTTP, although it has high reliability, depends on the resources on the AV server side in order to maintain its real time performance. For example, the AV server side has to manage resource allocation for handling the accumulated data requiring a high-bit rate transfer speed, for being multiple-accessed simultaneously, or the like, with consideration given to its throughput. The following resource allocation managing methods are available: (1) A limit is set on the number of TCP connections for sending/receiving an HTTP message. In this case, if a client device tries to request network playback beyond the limit later, typically, an error message is sent to the client device, or alternatively, the request itself is ignored. The client device which has established a connection ahead of time, continues to play back AV content. This is the idea "prefetch priority", which means that a higher priority is given to the device which has established a connection ahead of time. Physical connection is typically based on the idea "prefetch priority".

On the other hand, (2) UPnP AV has a function called CMS (Connection Manager Service) for connection management, in which a command for establishing/disconnecting a logical connection (SOAP Action) is available. Specifically, the command for establishing a connection is CMS::PrepareForConnection. As receiving the command, the AV server issues an ID if there are enough resources within the server. In order to disconnect the connection, the command CMS::ConnectionComplete is sent to the AV server so that the AV server releases the resources. The function CMS, which is used for establishing a logical connection, typically establishes an association, for example by adding an ID to an HTTP header, so as to work together with HTTP AV streaming.

The command CMS::ConnectionComplete is not necessarily issued only by the device which has acquired an ID by the command CMS::PrepareForConnection. Therefore, it is also possible that the connection which has been established by a client device is disconnected by another client device later, by issuing the command CMS::GetCurrentConnectionIDs for browsing IDs to which resources are allocated within the AV server and then sending CMS::ConnectionComplete to the AV server, so as to obtain and further release the IDs. This is the idea "postfetch priority", which means a higher priority is given to the device which has established a connection later. Logical connection is typically based on the idea "postfetch priority".

In the method (2), resources are thus managed based on the number of CMS logical connections, apart from the number of TCP connections.

The foregoing is disclosed, for example, in Patent Documents 1 and 2.

Patent Document 1: Japanese Laid-Open Patent Application No. 2002-84484

Patent Document 2: Japanese Laid-Open Patent Application No. 2004-348454

SUMMARY OF THE INVENTION

Problems that Invention is to Solve

As described above, the method of managing resources on the basis of the number of TCP physical connections and the like is based on the idea "prefetch priority" while the method of managing resources on the basis of the number of logical connections by UPnP AV CMS or the like is based on the idea "postfetch priority".

For example, (1) in the AV server which employs both the resource management method based on the number of TCP connections, and the resource management method based on the number of logical connections by CMS or the like, the "prefetch priority" function works if AV content are requested only with HTTP. Therefore, if a request is later issued by CMS::PrepareForConnection or the like, this AV server is disadvantageous in that the resources cannot be allocated nor can be released by CMS::ConnectionComplete or the like.

Furthermore, (2) in the AV server which employs the resource management method only based on the number of logical connections by CMS or the like, the "postfetch priority" function works constantly. Therefore, this AV server is disadvantageous in that playback is interrupted anytime by anyone while a personal service such as video on demand is being provided.

In addition, (3) in the future, the environment is feasible in which one at-home AV server has client devices for family members, connected thereto via a home network so that content are available to each of the members. In this case, in order to manage the resources of the effective number of connections appropriately in the AV server, when AV content mainly based on UPnP are distributed, a request is made so that a logical connection is established before a physical connection is established so that the content themselves are distributed. However, among client devices as of now, the device which makes a content acquisition request firstly through physical connection is commonly used. In such a case, as shown in S134 of FIG. 13, since the AV server 140 cannot identify a logical connection ID and then returns an error reply as no connection (S136), the client device 130 cannot acquire the requested content.

The present invention is conceived in order to solve the above problems, and it is an object of the present invention is to provide an AV server which archives the functions "prefetch priority" and "postfetch priority", by employing both physical connection and logical connection, in a connection with client devices requesting AV content.

Means to Solve the Problems

In order to achieve the abovementioned objective, the AV server according to the present invention is a server connected to a network, and distributes content to a client device requesting the content, the AV server including: a communication unit which sends and receives a communication packet; a content data distribution unit which distributes content data to the client device using said communication unit, based on a physical connection; a content data accumulation unit which accumulates the content data; a protocol processing unit which processes a command for managing a logical connection using said communication unit; and a connection management unit which manages a connection with the client device, based on the physical connection of the content data distribution unit and the logical connection of the protocol processing unit, based on a connection ID, in which, in the case where said communication unit receives a content data distribution request based on the physical connection from the client device, said content data distribution unit is operable to check the connection ID in said connection management unit, and in the case where the connection ID cannot be checked, said content data distribution unit is operable to request said connection management unit to create a connection ID.

In addition, the connection management unit of the AV server according to the present invention, in the case where the connection management unit is requested to create the connection ID, the connection management unit creates the connection ID and to respond to the content data distribution unit, the content data distribution unit requests the content data accumulation unit to acquire content data, and to acquire the content data, and the communication unit sends the content data to the client device based on the physical connection.

According to this configuration, even when a content data distribution request based on the physical connection is received from the client device before the logical connection is established, the content data distribution unit can distribute content data to the client device via the communication unit by creating a connection ID in the connection management unit, even if the content data distribution unit determines that no connection ID is added as connection type determination, or equivalently, if a content data distribution request is made before a logical connection is established.

The connection management unit according to the present invention manages at least a priority table showing a relation between the address information of each of the client devices connected to the AV server, and priorities to the logical connection to be established, and when the protocol processing unit receives a command for deleting the connection ID information stored in the connection management unit from the client device, the connection management unit refers to the priority table, and deletes the connection ID stored in the connection management unit in the case where a deletion request is made from the client device having a higher priority.

According to this configuration, the connection request from the client device having a higher priority can take precedence with reference to the priorities in a logical connection of the client devices with the AV server shown in the priority table. If a limit is set on the number of connections of the AV server connected to a plurality of client devices, the connection can be used effectively.

The connection management unit according to the present invention manages connection management information including at least one of the connection ID; address information of the client device to be a destination of establishing the logical connection; address information of the client device to be a destination of establishing the physical connection; service information of the content; and priorities to the logical connection establishment assigned to each of the client devices, and when receiving a command for deleting the connection ID information stored in said connection management unit from the client device, the protocol processing unit refers to the connection management information, in the case where a predetermined connection ID is added thereto, the protocol processing unit does not delete the connection ID stored in the connection management unit.

According to this configuration, based on the information included in the connection management information, the AV server performs connection and disconnection so as to connect with a more appropriate client device.

In order to achieve the above object, the present invention may also be applied as a connection management method including typical configuration units of the server in the form of steps, or as a program including typical instructions of the method. It goes without saying that such a program can be distributed via a storage medium such as a CD-ROM, or a communication network such as the Internet.

Effects of the Invention

According to the AV server of the present invention, also in the method of managing resources based on the number of TCP physical connections, the function "postfetch priority" becomes available by employing logical connection management at the same time, while the function "prefetch priority" becomes available in logical connection management, thereby allowing the connection between the AV server and the client devices to be managed appropriately.

BRIEF DESCRIPTION OF DRAWINGS

FIG. 5 shows a piece of metadata about content data according to the first embodiment.

FIG. 12 shows connection management information according to the first embodiment.

NUMERICAL REFERENCES

Figure 1:
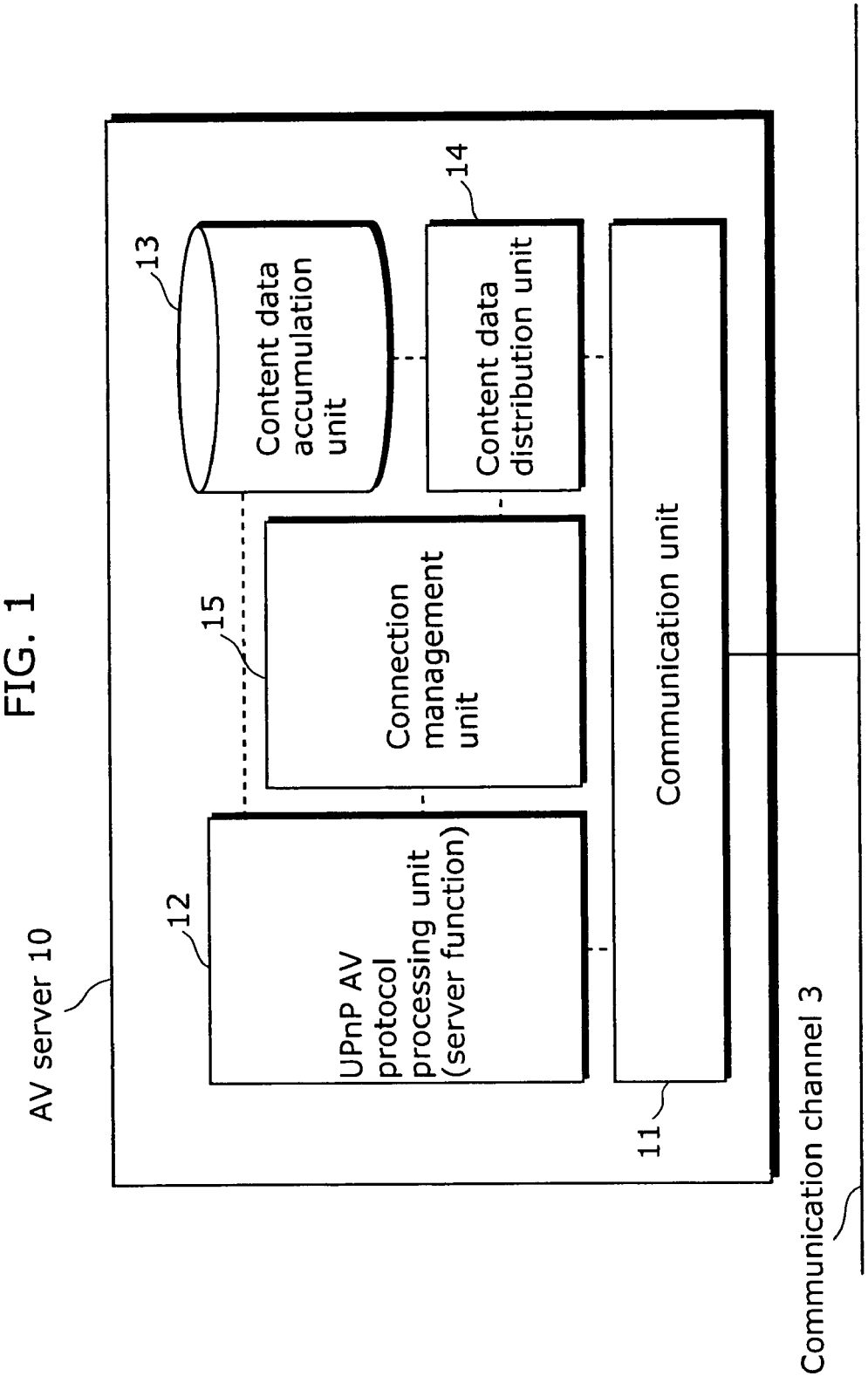
FIG. 1 is a block diagram showing the configuration of a main part of an AV server according to a first embodiment of the present invention.

3 Communication channel
10 AV server
11 Communication unit
12 UPnP AV protocol processing unit (server function)
13 Content data accumulation unit
14 Content data distribution unit
15 Connection management unit
20 Client device
21 Communication unit
22 UPnP AV protocol processing unit (client function)
23 Content data receiving unit
24 Content data playback unit
50 Metadata
120 Connection management information
121 Priority table

DETAILED DESCRIPTION OF THE INVENTION

Hereinafter, a description is given for the best modes for carrying out the present invention with reference to accompanying drawings.

First Embodiment

FIG. 1 is a block diagram showing the configuration of a main part of an AV server 10 according to this embodiment.

The AV server 10 includes a communication unit 11 which communicates with a client device via a communication channel 3. As the communication channel 3, in this case, a cable communication channel such as Ethernet (registered trademark), or a wireless communication channel such as IEEE 802.110/b/g or Bluetooth is employed.

The AV server 10 further includes a Universal Plug and Play AV-compliant protocol processing unit 12 which performs processes including retrieval of a UPnP AV-compliant device and capability exchange. The protocol processing unit 12 also receives a UPnP AV command sent by the UPnP AV-compliant client device, and operates in accordance with the received command.

There is provided a content data accumulation unit 13 so as to accumulate a recorded TV program, moving image data obtained by a DVC (Digital Video Camera) or the like, still image data obtained by a DSC (Digital Still Camera) or the like, or audio data such as a recorded radio program, or a musical piece recorded on a CD (Compact Disc) (hereinafter, such moving image data, still image data, and audio data each are referred to as "content data").

For these pieces of content data, the client device acquires their title information, recording date information, location information including a URL (Uniformed Resource Locator) (hereinafter, these pieces of information are referred to as "metadata" collectively) via the UPnP AV protocol processing unit through a UPnP AV command request. The content data accumulated in the content data accumulation unit 14 is distributed to the client device with a content data distribution unit 14 such as HTTP (Hyper Text Transport Protocol). The session information on an HTTP connection for distributing content data is managed by a connection management unit 15. The client device acquires a list of session information items managed by the connection management unit 15 through a UPnP AV command request via the UPnP AV protocol processing unit.

Figure 2:
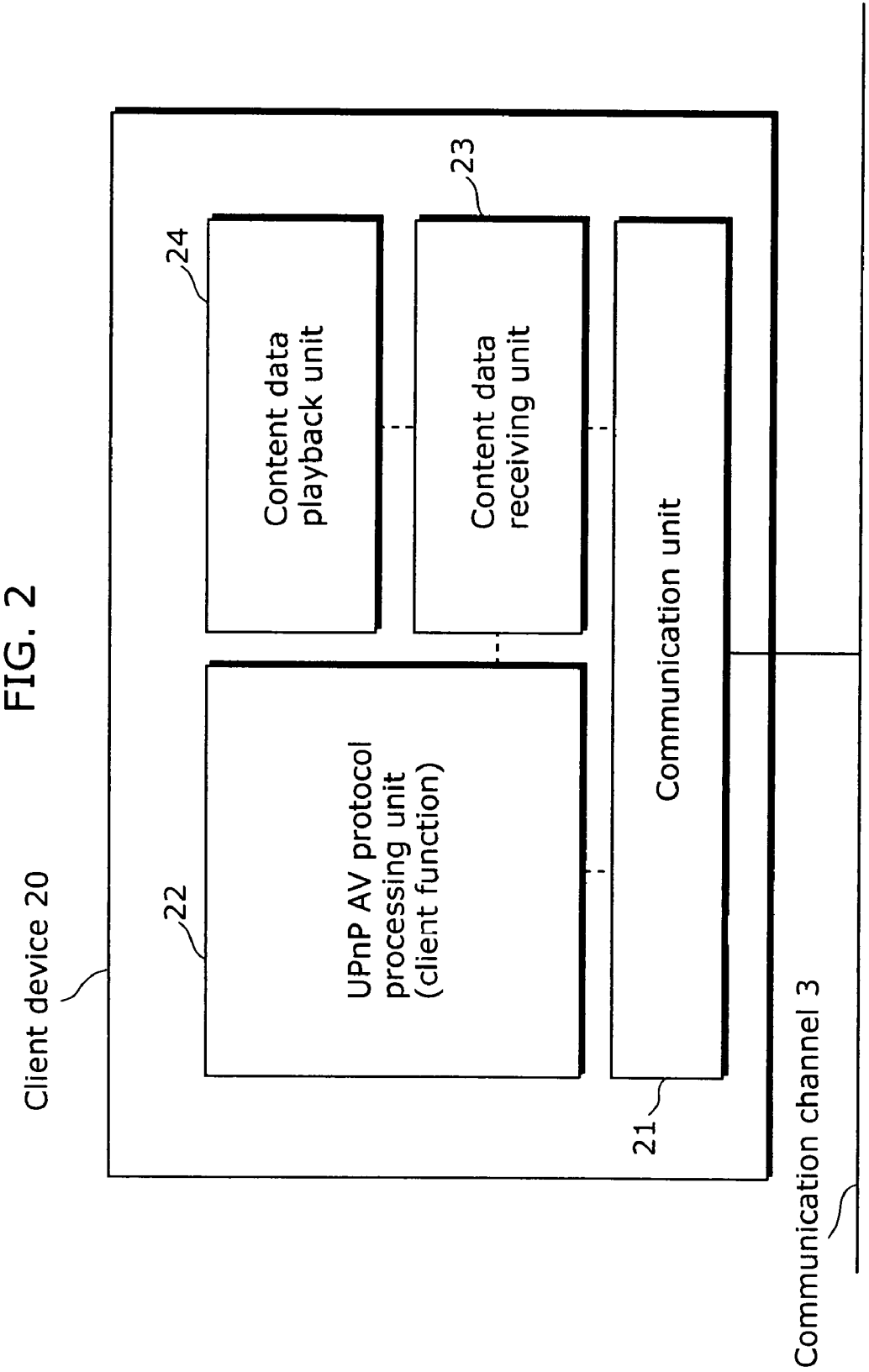
FIG. 2 is a block diagram showing the configuration of a main part of a client device according to the first embodiment.

FIG. 2 is a block diagram showing the configuration of a main part of a client device 20.

The client device 20 includes a communication unit 21 which communicates with the AV server via the communication channel 3. The client device 20 also includes a UPnP AV-compliant protocol processing unit 22 which sends a UPnP AV command to the UPnP AV-compliant AV server so as to control the AV server remotely.

The client device 20 further includes a content data receiving unit 23 which receives content data from the AV server so as acquire content data through HTTP or the like. The acquired content data is played back by a content data playback unit 24. In this case, if the content data to be played back is moving image data which is MPEG-encoded (Moving Picture Experts Group), an MPEG encoder is employed for the content data playback unit 24.

Figure 3:
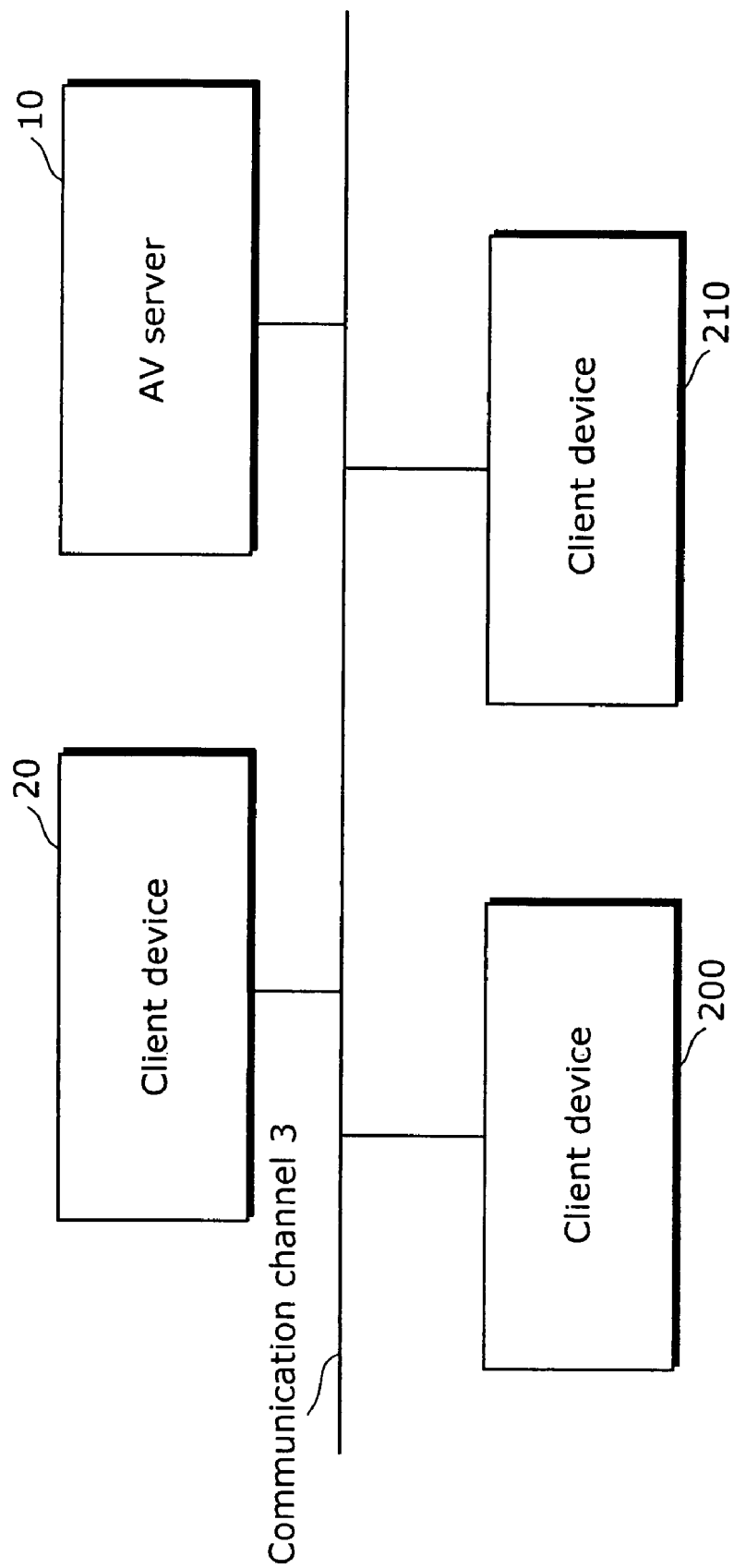
FIG. 3 shows the configuration of a network connecting the AV server and the client devices according to the first embodiment.

FIG. 3 shows the configuration of a network connecting the AV server 10, the client device 20 as well as client devices 200 and 210 together according to this embodiment.

The AV server 10, the client device 20, the client device 200, and the client device 210 are connected together via the communication channel 3. In this case, the client device 20, the client device 200, and the client device 210 recognize the AV server 10 owing to the retrieval function of a UPnP device.

The AV server 10, the client device 20, and the client device 200, which support CMS::PrepareForConnection and CMS::ConnectionComplete as UPnP AV option commands, support both logical and physical connections.

On the other hand, the client device 210 does not support the above two UPnP AV commands. Specifically, the client device 210 supports physical connection, but not logical connection. Whether or not the option commands are supported is device dependent; their support is not obligatory under the UPnP AV standard.

Figure 4:
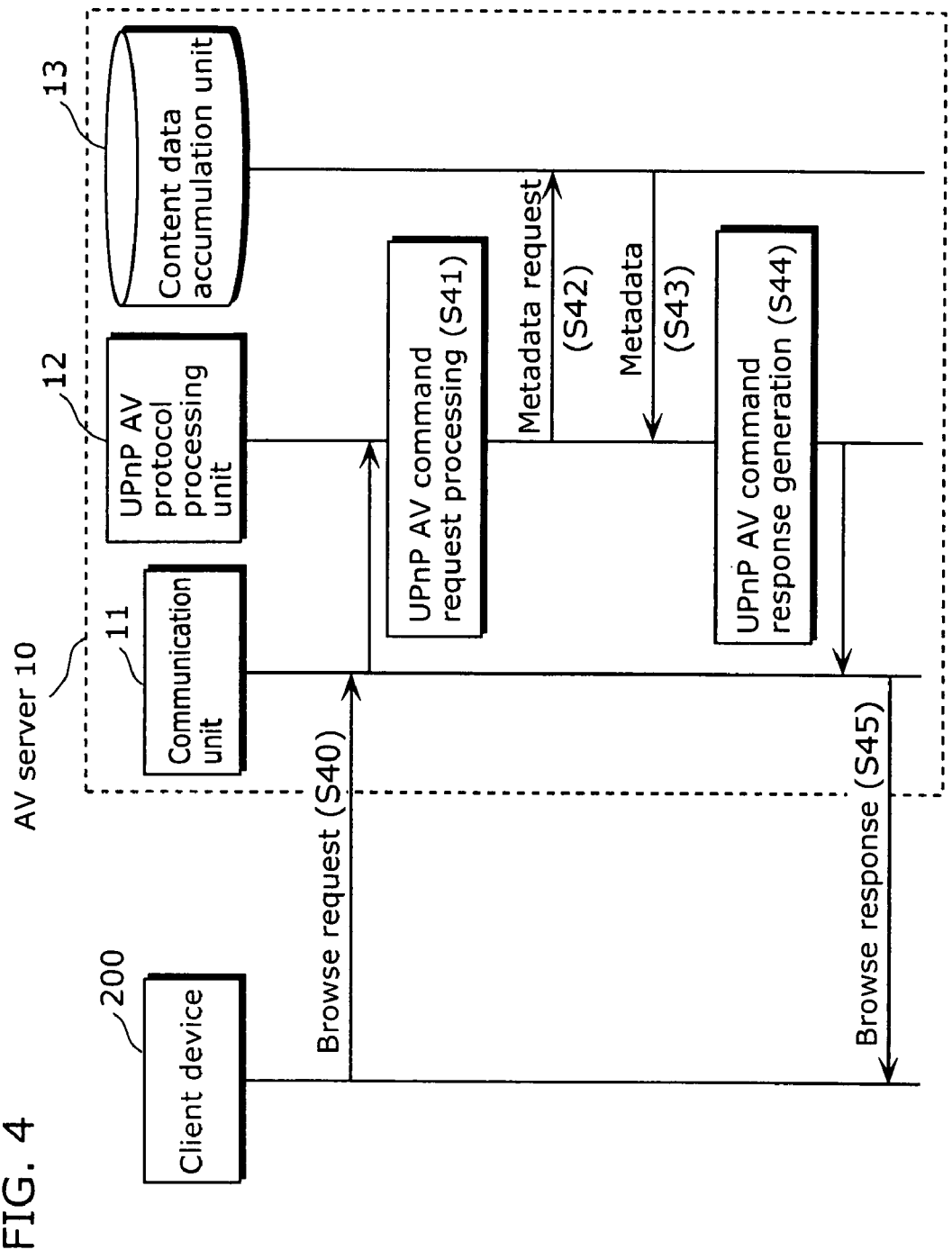
FIG. 4 shows a sequence in which metadata is acquired according to the first embodiment.

FIG. 4 shows a sequence in which the client device 200 acquires the metadata about the content data accumulated in the content data accumulation unit 13 of the AV server 10. Note that the sequence for acquiring the metadata is the same as in the conventional technology.

The client device 200 specifies a desired piece of content data, and sends a CDS::Browse request command as a UPnP AV command for acquiring the metadata about the content data (S40). In the AV server 10, which has received the CDS::Browse request, the UPnP AV protocol processing unit 12 processes the CDS::Browse request command (S41), and acquires the metadata about the content data specified by the client device 200 in accordance with the content of the command (S42, S43). The content data accumulation unit 13 may accumulate the metadata as part of its content data, and respond to the UPnP AV protocol processing unit 12. Alternatively, the content data accumulation unit 13 may receive a metadata request, and then create metadata dynamically from its content data.

The UPnP AV protocol processing unit 12 generates a CDS::Browse response command from the received metadata (S44), and then responds to the client device 200 (S45).

In a similar sequence, the client device 210 acquires the metadata about a desired piece of content data from the AV server 10.

FIG. 5 shows a piece of metadata 50 about the content data included in the CDS::Browse response command to be sent from the AV server 10 to the client device 200, described in FIG. 4. The metadata 50, which is described by XML (extensible Markup Language), includes title information, recording date information, and content data location information.

Before acquiring content data, the client device 200 sends a CMS::PrepareForConnection request command as a UPnP AV command so as to establish a logical connection with the AV server 10.

Figure 6:
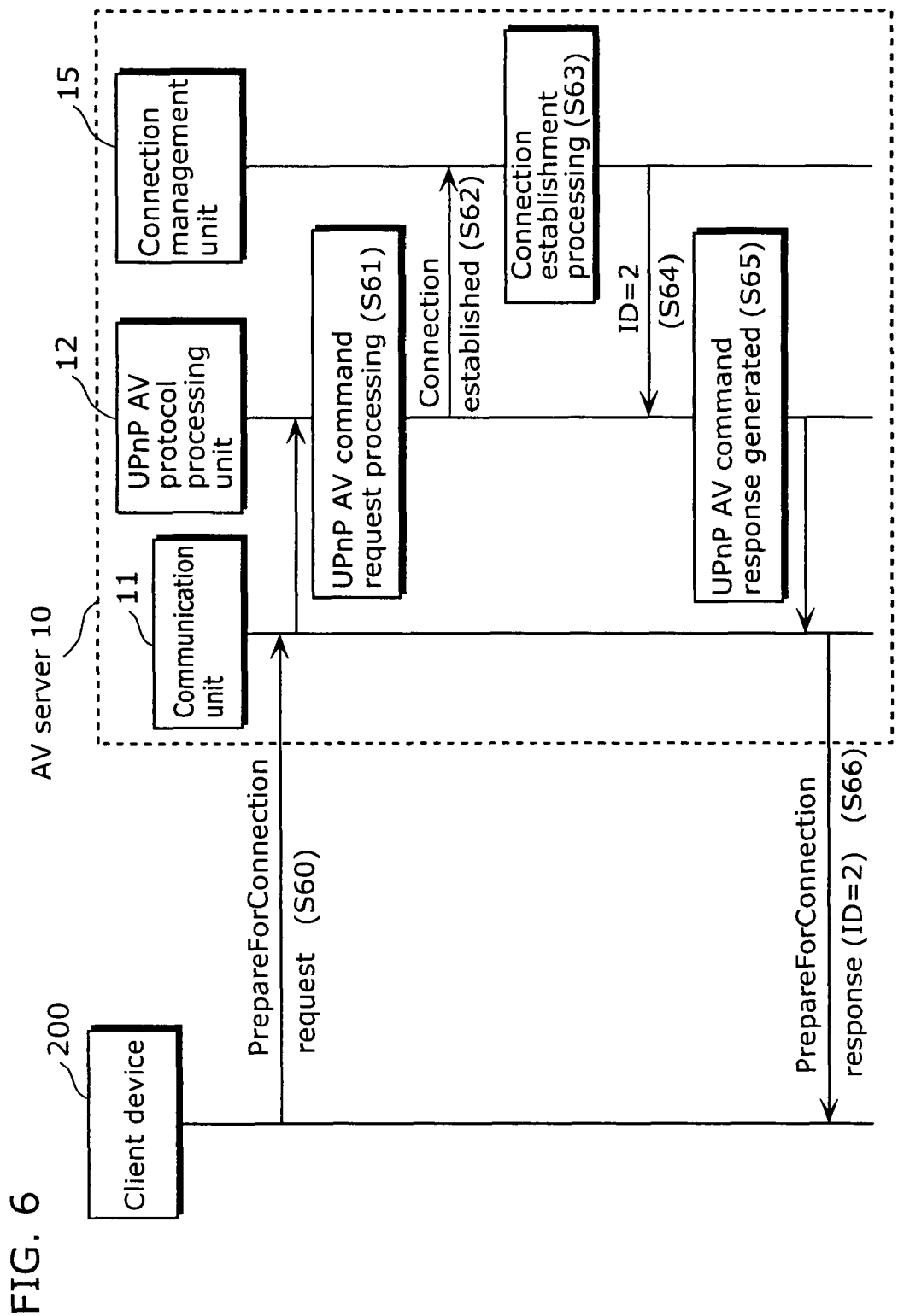
FIG. 6 shows a sequence of a procedure for establishing a logical connection between the AV server and the client device according to the first embodiment.

FIG. 6 shows a sequence in which a logical connection is established between the AV server 10 and the client device 200. Note that the sequence shown in FIG. 6 is also the same as in the conventional technology.

The client device 200 sends a CMS::PrepareForConnection request command to the AV server 10 (S60). In the AV server 10, which has received the CMS::PrepareForConnection request, the UPnP AV protocol processing unit 12 processes the CMS::PrepareForConnection request command (S61), and requests the connection management unit 15 to establish a logical connection (S62).

The connection management unit 15, which has received the logical connection establishment request, newly establishes a logical connection if the connection is within the limit of the number of manageable logical connections, and allocates a uniquely identifiable ID (hereinafter referred to as "connection ID") to the connection. The connection management unit 15 also informs the UPnP AV protocol processing unit of the connection ID (S64). In this case the number "2" is allocated as a connection ID. The connection ID is described in a CMS::PrepareForConnection response command by the UPnP AV protocol processing unit 12 (S65) and sent to the client device 200 (S66).

Figure 7:
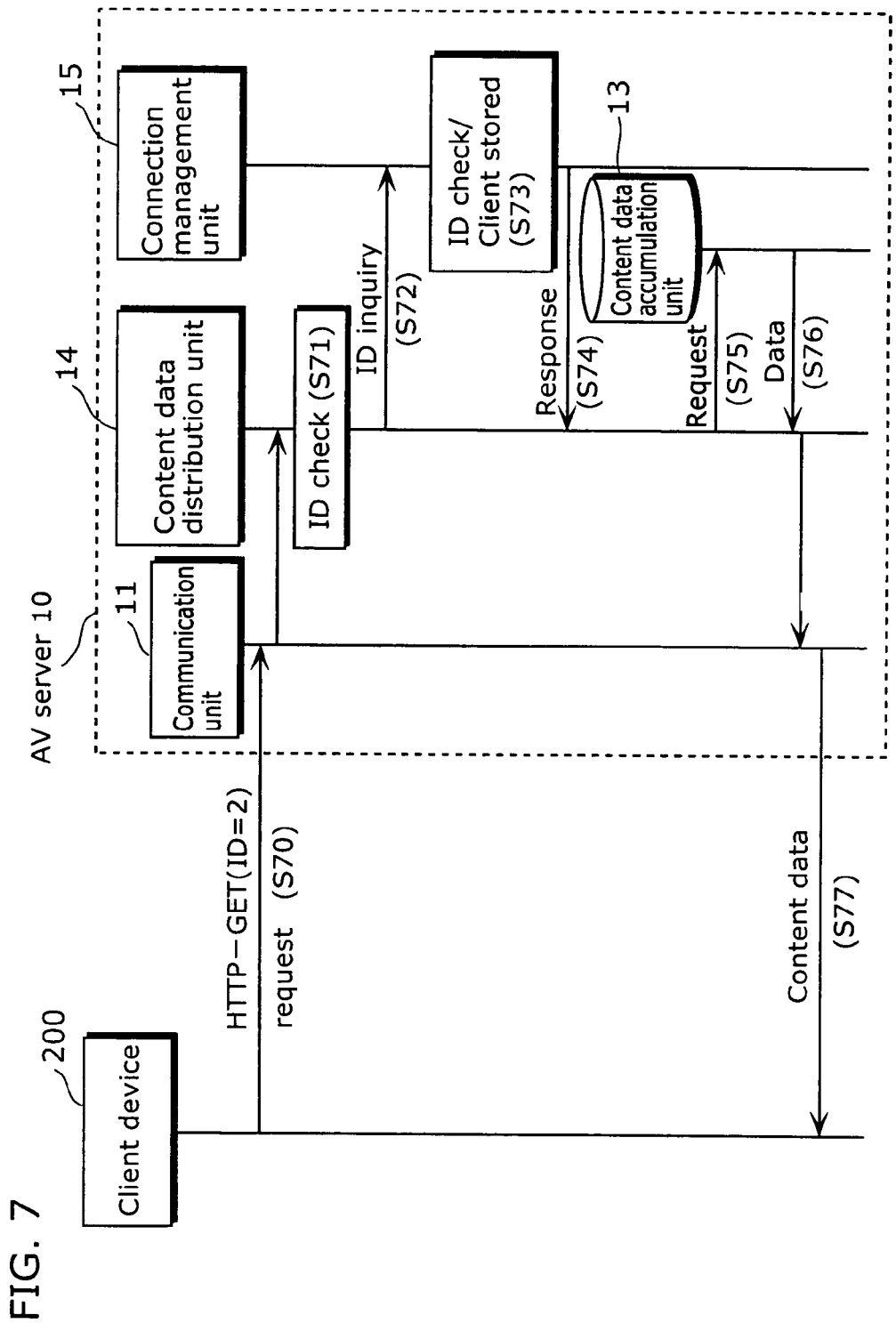
FIG. 7 shows a sequence for acquiring content data, in which a logical connection is established according to the first embodiment.

Next, a sequence is shown in FIG. 7, in which the content data is acquired by establishing a physical connection based on the acquired content data location information. Note that the sequence shown in this figure is the same as in the conventional technology.

The client device 200 issues an HTTP-GET request against the URL included in the metadata about the content data (S70). In this case, the connection ID of the logical connection which has been established is added to the HTTP header.

The content data distribution unit 14 within the AV server 10, which has received the HTTP-GET request, has the connection ID added to the header of the HTTP-GET request therein (S71). The content data distribution unit 14, therefore, inquires of the connection management unit 15 whether or not the relevant connection ID exists (S72). The connection management unit 15 ensures that the inquired connection ID exists, stores the connection ID by associating it with address information including the client's IP address and MAC address (S73), and responds to the content data distribution unit 14 (S74). The content data distribution unit 14 sends a content data acquisition request to the content data accumulation unit 13 (S75) so as to acquire data (S76). The content data distribution unit 14 sends the acquired content data to the client device 200 with HTTP (S77).

Figure 8:
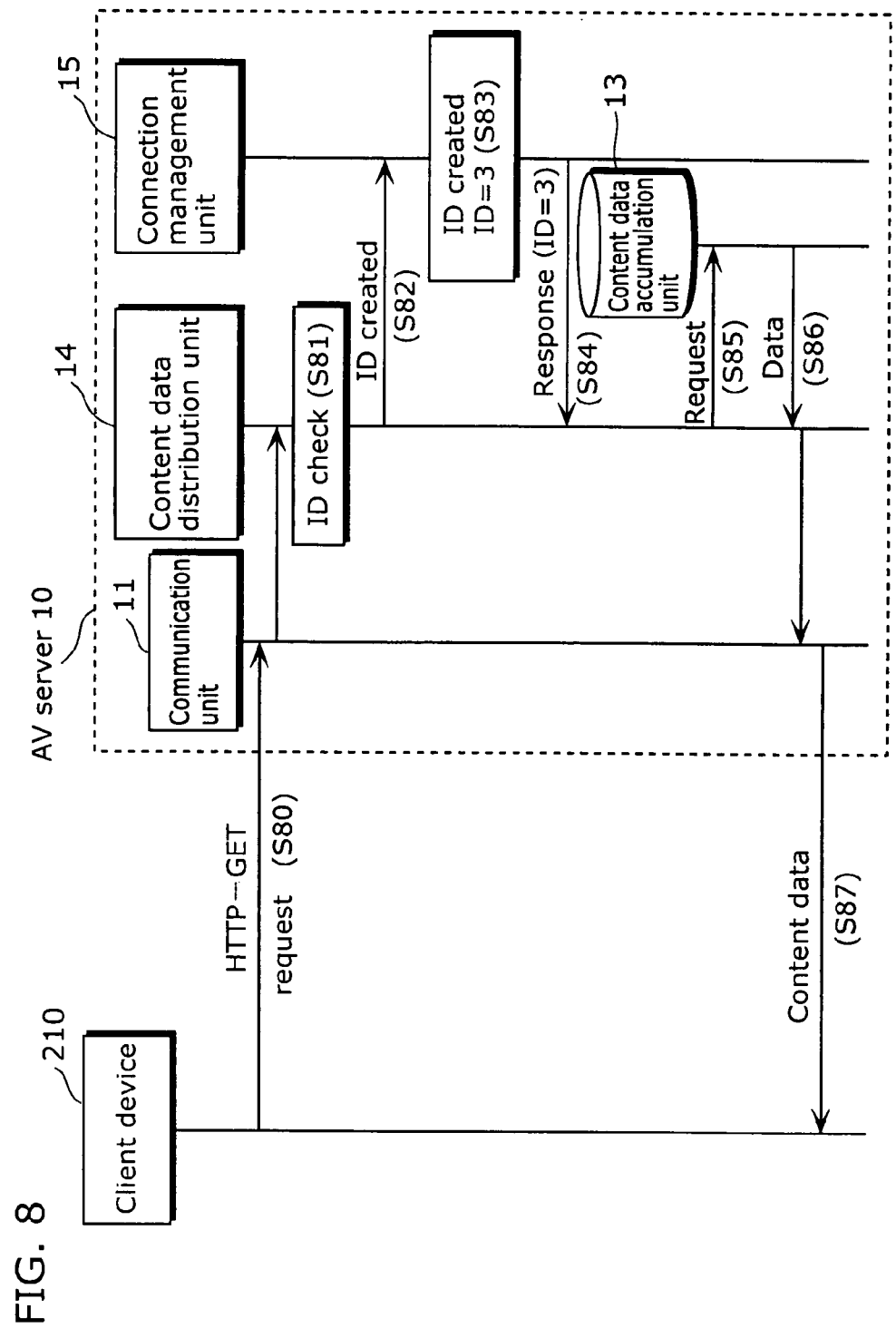
FIG. 8 shows a sequence for acquiring content data without establishing any logical connection according to the first embodiment.

FIG. 8 shows a sequence in which the client device 210 not supporting a CMS::PrepareForConnection command acquires content data. This figure describes the features of the AV server 10 which distributes content data to the client device 210 for making a content data acquisition request firstly through a physical connection.

Similarly to the sequence shown in FIG. 4, the client device 210 sends a CDS::Browse request command to the AV server 10, and acquires the URL of a desired piece of content data in accordance with its response command.

The client device 210 makes a request for acquiring content data against the URL (S80). In this case, since the content data distribution unit 14 which has received the HTTP-GET request has no content ID added to the HTTP header (S81), a request for establishing a new logical connection is issued to the connection management unit 15 (S82). Having enough manageable connection capacity, the connection management unit 15 establishes a logical connection so as to add a connection ID (S83), stores the connection ID by associating it with the address information of the client device 210, and informs the content data distribution unit 14 of the connection ID (S84). After that, the content data distribution unit 14 sends a content data acquisition request to the content data accumulation unit 13 (S85), and acquires the desired piece of content data (S86). The content data distribution unit 14 converts the acquired content data into HTTP format so as to send the data to the client device 200 (S87).

As mentioned above, the AV server 10 according to the present invention, even if having no content ID added to the HTTP header, or specifically if an HTTP-GET request is received from the client device 210 in which no logical connection has been established, requests the establishment of a new logical connection to the connection management unit 15 so as to add a connection ID.

Another description is given for the case in which the client device 20 acquires content data from the AV server 10 while the client device 200 and the client device 210 are receiving content data from the AV server 10.

Figure 9:
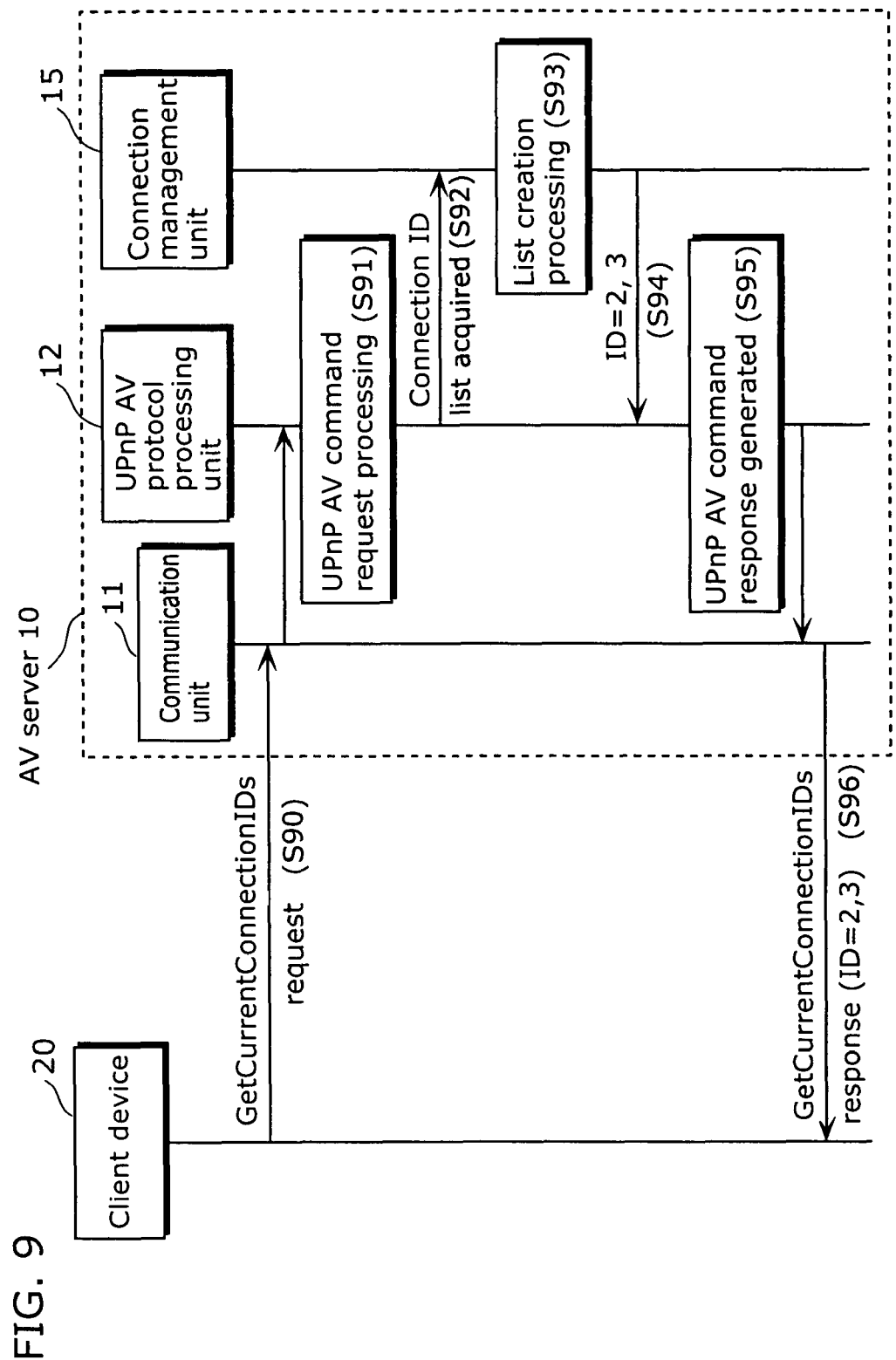
FIG. 9 shows a sequence for acquiring a connection ID list according to the first embodiment.

The client device 20, which supports a CMS::PrepareForConnection command, tries to establish a logical connection before receiving content data, similarly to the sequence shown in FIG. 6. In this case, for example, if the number of logical connection manageable simultaneously is two, since a logical connection has already been established by the client device 200 and the client device 210, the AV server 10 returns a process failure response to the CMS::PrepareForConnection request command of the client device 20. Accordingly, in order to acquire the connection ID created by the AV server 10, the client device 20 issues a CMS::GetCurrentConnectionIDs request command. The sequence is shown in FIG. 9.

First, the client device 20 sends a CMS::GetCurrentConnectionIDs request command to the AV server 10 (S90). In the AV server 10, which has received the CMS::GetCurrentConnectionIDs request, the UPnP AV protocol processing unit 12 processes the CMS::GetCurrentConnectionIDs request command (S91), and requests the connection management unit 15 to create the list of the connection IDs currently under its management (S92). The connection management unit 15, which has received the connection ID list generation request, creates the list of the connection IDs under its management (S93), and informs the UPnP AV protocol processing unit of the connection IDs (S94). The connection ID list is converted into a CMS::GetCurrentConnectionIDs response command by the UPnP AV protocol processing unit 12 (S95) so that the command is sent to the client device 20 (S96).

Figure 10:
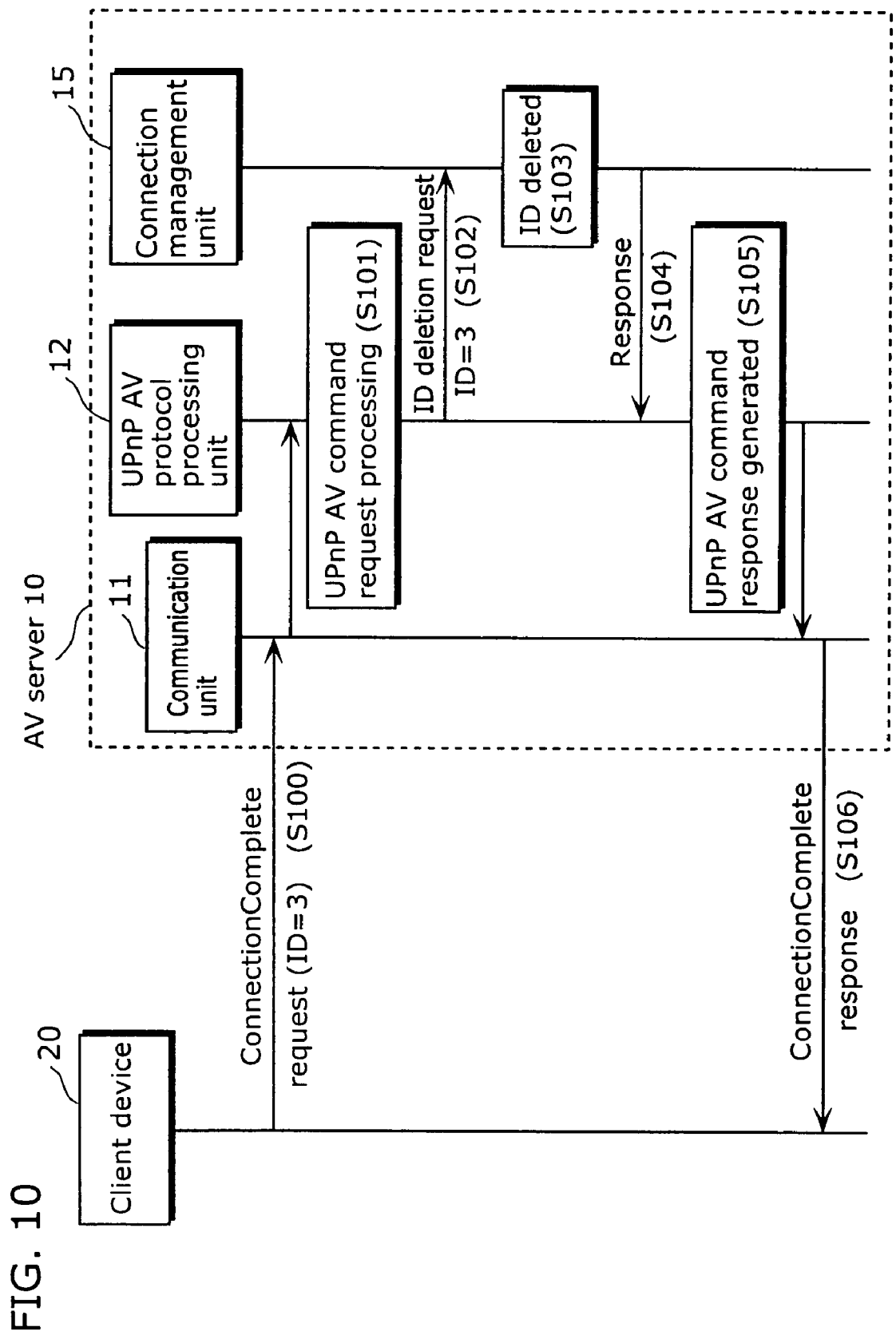
FIG. 10 shows a sequence for deleting a connection according to the first embodiment.

Next, the client device 20 deletes the logical connection managed with the connection ID "3". FIG. 10 shows a sequence in which a logical connection is deleted.

The client device 20 sends a CMS::ConnectionComplete request command to the AV server 10 (S100). In the AV server 10, the UPnP AV protocol processing unit 12 processes the CMS::ConnectionComplete request command (S101), and requests the connection management unit 15 to delete a logical connection specified by its connection ID (S102). In the connection management unit 15 which has received the logical connection deletion request, for example, with reference to the priority table of FIG. 12 (B) (to be described later) showing priorities assigned to the client devices (to be described later), if the deletion request is made from a client device having a higher priority (the client device 20 in the figure), the logical connection identified with its connection ID is deleted (S103), and the processed result is notified to the UPnP AV protocol processing unit (S104). The processed result is converted into a CMS::ConnectionComplete response command by the UPnP AV protocol processing unit 12 (S105), and sent to the client device 20 (S106).

In this case, the client device 20 issues a CMS::PrepareForConnection request command in the above-mentioned procedure so as to establish a logical connection with the AV server 10. Subsequently, the desired piece of content data stored in the content data accumulation unit 13 within the AV server 10 is acquired by an HTTP-GET request, and played back by the content data playback unit 24.

Figure 11:
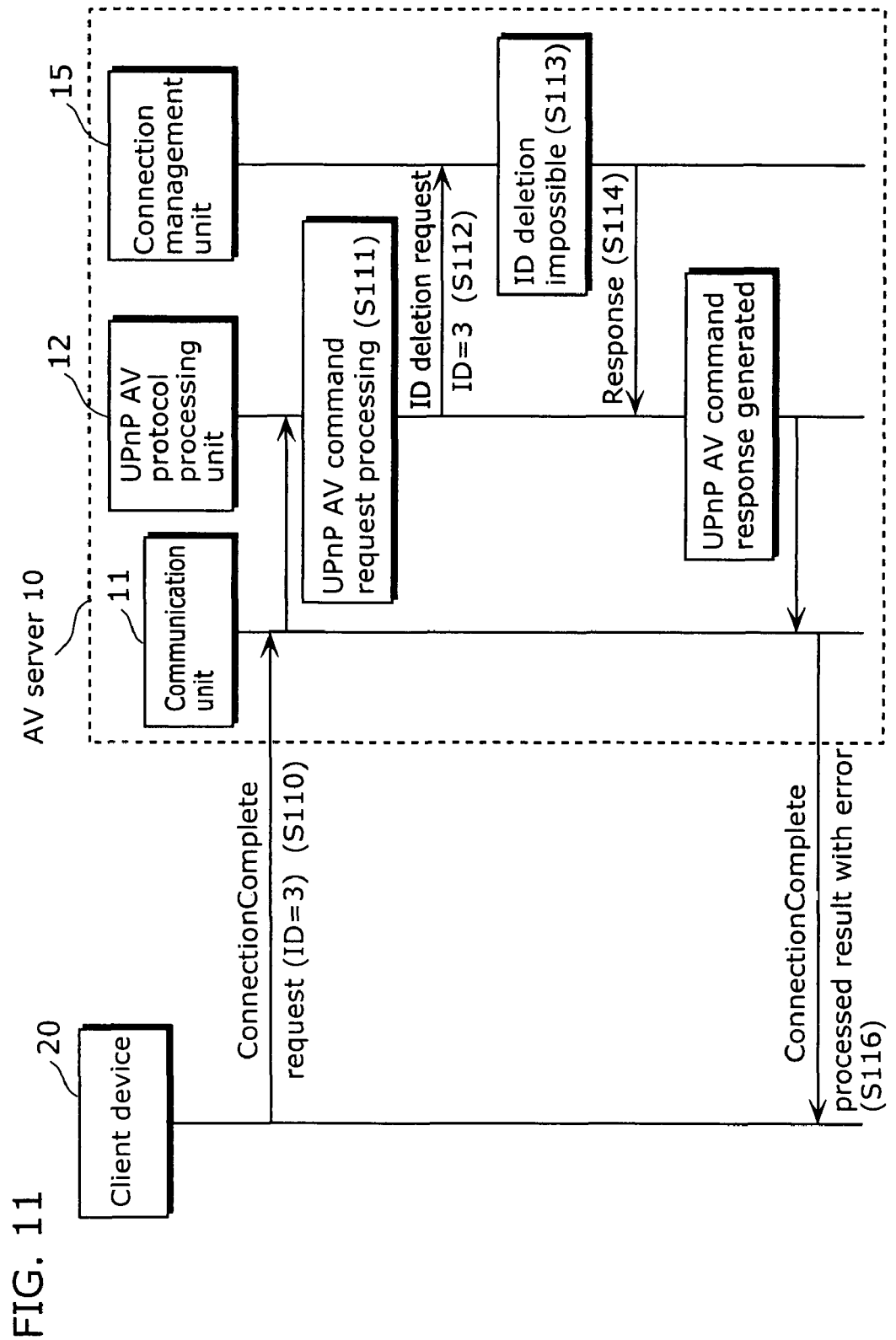
FIG. 11 shows a sequence in which a connection cannot be deleted according to the first embodiment.
Figure 13:
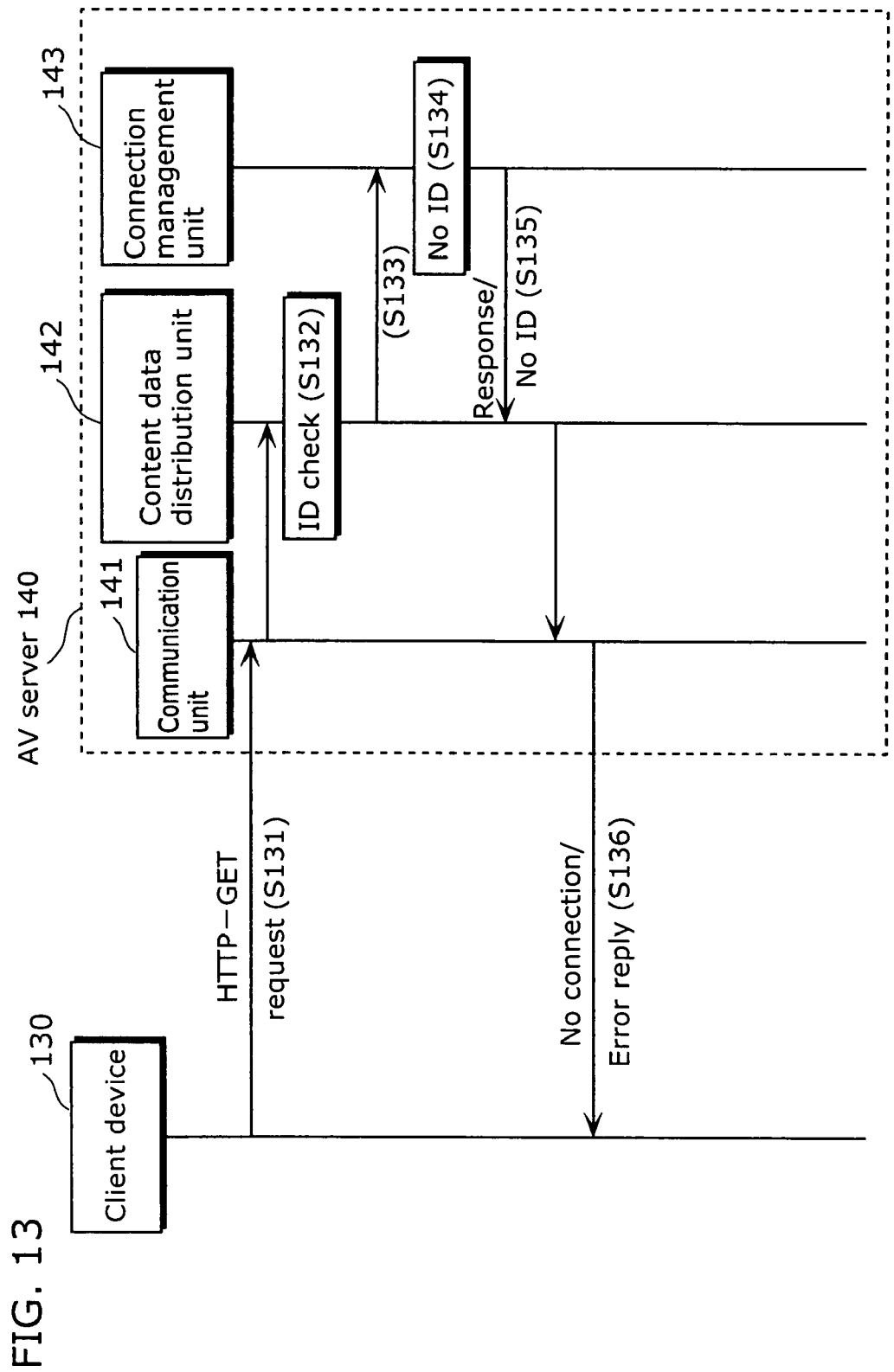
FIG. 13 shows a conventional sequence for acquiring content data in which no logical connection is established.

Note that FIG. 11 shows a sequence in which the client device 20 cannot delete the logical connection having "3" as its connection ID.

In this figure, the process from S100 to S112 is the same as the process from S100 to S102 in FIG. 10. However, since the deletion request is made from a client device with a lower priority (the client device 20 in the figure), a determination is made that it is impossible to delete the logical connection ID (S113). The processed result is notified to the UPnP AV protocol processing unit (S114). The UPnP AV protocol processing unit 12 returns a CMS::ConnectionComplete command response containing a parameter having a field showing the processed result with error information therein (S115), to the client device 20 as an error response (S116). The error response, for example, extends an error code and sends an error message saying that "no more connections to be established".

As has been described above, the AV server according to the first embodiment determines whether or not a content ID is added to the HTTP header as shown in S81 to S84 of FIG. 8. If no connection ID is added, or equivalently, if the HTTP-GET request based on a physical connection is received from a client device before a logical connection is established, a request for establishing a new logical connection is made to the connection management unit 15. This allows the connection ID to be used for the logical connection, to be added if there is enough manageable connection capacity, thereby managing the connection between the client device and the AV server appropriately.

Hereinafter, a description is given for a modified example of the configuration which has been described in this embodiment.

The above first embodiment relates to the configuration in which a client device explicitly issues a CMS::ConnectionCompelete request command so as to delete a logical connection. However, the configuration may be such that the AV server connected via logical connection or the AV server connected to a client device, requests the connection management unit to disconnect the relevant logical connection if the content data distribution unit detects the disconnect of HTTP connection or TCP connection.

Furthermore, the configuration may be such that the AV server having a time limit such as 30 minutes requests the connection management unit to disconnect the relevant logical connection if an HTTP-GET request has not been received within the time limit.

Furthermore, the configuration may be such that HTTP header information is range-specified when an HTTP-GET request is made so that a plural number of HTTP-GET requests are made to acquire content data.

Second Embodiment

Next, a description is given for an AV server according to a second embodiment of the present invention with reference to accompanying drawings. Referring to FIG. 10 and FIG. 11, the above first embodiment describes the method by which the client device which participates in a network in a later order deletes the established connection based on priorities or the like so as to establish a new connection. This embodiment, however, describes the method of prohibiting the client device which has participated in a network in a later order from deleting the established connection.

The configurations of the AV server and the client device according to this embodiment are the same as in the first embodiment, so their descriptions are omitted here.

In this case, referring to FIG. 6, responding to the CMS::PrepareForConnection request command from the client device 200, when the AV server 10 is prepare to establish the relevant logical connection not to be deleted by the CMS::ConnectionComplete request command, a CMS::PrepareForConnection response command having "0" as its connection ID is sent to the client device 200.

The connection ID "0" means that the connection management unit 15 manages only the number of logical connections, without managing client device information such as the address information of client devices.

In the network configuration shown in FIG. 3, the AV server 10 returns a CMS::PrepareForConnection response command having "0" as its connection ID to the CMS::PrepareForConnection request command from the client device 200. After that, the client device 200 makes an HTTP-GET request including the connection ID "0" as its HTTP header information to the AV server 10 so as to acquire content data.

Furthermore, responding to the HTTP-GET request from the client device 210, the AV server 10 manages the relevant logical connection by assigning the connection ID "0" thereto, using the connection management unit 15.

Next, the client device 20 issues a CMS::PrepareForConnection request command to the AV server 10. However, since the number of logical connections which the AV server 20 are managing has reached a maximum manageable value (two in the description of this embodiment), the client device 20 error-responds to the CMS::PrepareForConnection response command. Next, the client device 20 issues a CMS::GetCurrentConnectionIDs request command. The AV server 10 returns "ID=0" as a CMS::GetCurrentConnectionIDs response command.

The client device 20 sends a CMS::ConnectionComplete request command having "0" as its connection ID. Since no information about the logical connection identified with the relevant connection ID included in the connection management unit 15 within the AV server 10, the logical connection identified with the relevant connection ID is not deleted. While a CMS::ConnectionComplete response command is returned to the client device 20, the connection remains established in the client device 200 and the client device 210.

At the point when the content data acquisition is completed in the client device 200 and the client device 210, the HTTP connection is disconnected. As the HTTP connection is disconnected, the content data distribution unit 14 requests the connection management unit 15 to delete a logical connection. The requested connection management unit 15 deletes the logical connection which is under its management.

The example is here given in which the logical connection identified with the connection ID "0" is the condition for disconnecting HTTP connection, but the disconnection of TCP connection may be the condition for disconnecting a logical connection.

Furthermore, as shown in FIG. 12(a), the address information of the client device which has sent a CMS::PrepareForConnection request command (destination of PFC establishment), the address information of the client device in which an HTTP connection is established (destination of HTTP distribution), the type of the content data during distribution (service) such as television, VOD (Video On Demand), their priorities are stored as connection management information 120. For example, the configuration may be such that a logical connection whose service is VOD is not deleted by a CMS::ConnectionComplete request command. This example relates to the case in which the condition for rejecting logical connection deletion based on one type of information (service), but the condition may be set based on the combination of two types or more of information such as destination of HTTP distribution and service.

As shown in the connection management information 120 of FIG. 12(a), if the service type of content to be distributed is VOD, the connection ID becomes "0" so that the logical connection cannot be disconnected. Furthermore, the second connection, which does not specify its PFC establishment destination, is the connection established when a client device firstly requests content acquisition using physical connection. The third connection in the connection management information 120, which has PFC establishment and HTTP distribution destinations different from each other in address. This is an example in which a logical connection is established by a different client device.

The priorities shown in the connection management information 120 are used for determining whether or not a logical connection is disconnected by a different client device. For example, while Father's client device having "1" as its priority order can disconnect the connection of Brother's device having "3" as its as its priority order, Brother's client device cannot disconnect the logical connection of Father's device freely.

FIG. 12(B) shows one example of a priority table 121 managed by the AV server according to the present invention. This figure illustrates the relation between the IP addresses of the client devices connected to the AV server and their priorities for establishing a logical connection. By referring to the priority table 121, for example, as shown in FIG. 10 and FIG. 11, it becomes possible for the AV server to delete the connection ID which has been established by the client device having a lower priority number from the client device having a higher priority number. Although FIG. 12 relates to the example in which IP addresses are employed for address information, physical addresses such as MAC addresses may also be employed.

As has been described above, the AV server according to the second embodiment, using the connection management information 120 and the priority table 121, appropriately manages the connections with client devices having a limit on the number of connections.

Furthermore, the AV server according to the second embodiment, in a home network standard, manages a new connection while preserving backward compatibility. In addition, by using the connection management information 120 and the like, for image distribution by TV broadcasting, connections are managed based on the principle "postfetch priority" while, for image distribution by video on demand or the like, which is personally available anytime, connections are managed based on the principle "prefetch priority". The AV server according to the second embodiment thus achieves efficient resource management in accordance with service types.

The second embodiment relates to the configuration in which the connection ID "0" is handled as a reserved value having no detailed information about logical connection in the connection management unit, but it goes without saying that any value except "0" is applicable to the reserved value.

If the value "0" is specified as a connection ID, the configuration may be such that content data is exchanged only with an actual HTTP connection without establishing a logical connection.

Furthermore, the configuration may also be such that the type of content to be distributed is determined, for example, so as to prohibit connection deletion during the distribution of content which are being recorded, and to permit connection deletion during the distribution of the content whose recording have been completed.

Although the above description does not relate to connection ID deletion timing, for example, the deletion may be made if a content distribution request has not been issued over a given period of time, or if a given period of time has passed after the destination of a content distribute request is specified from the IP address of the distribution request destination.

The configuration may also be such that the connection request made from the client device having a MAC address other than the MAC address registered for security reasons, is not accepted.

INDUSTRIAL APPLICABILITY

The AV server according to the present invention is applicable, for example, as an AV server which transfers multimedia content between home electrical appliances via a home network based on a UPnP-AV CDS compliant file transfer method.

The invention claimed is:

1. An AV server which is connected to a network and distributes content to a client device requesting the content, said AV server comprising:
   a communication unit operable to send and receive a communication packet;
   a content data distribution unit operable to distribute content data to the client device using said communication unit, based on a physical connection;
   a content data accumulation unit operable to accumulate the content data;
   a protocol processing unit operable to process a command for managing a logical connection using said communication unit; and
   a connection management unit operable to manage a connection with the client device based on a connection ID, the connection with the client device being based on (i)

the physical connection of said content data distribution unit and (ii) the logical connection of said protocol processing unit, wherein, in a case where said communication unit receives a content data distribution request based on the physical connection from the client device, said content data distribution unit determines whether or not the client device is associated with a connection ID, wherein, in a case where the client device is not associated with a connection ID, said content data distribution unit requests that said connection management unit create and store a connection ID that is associated with the client device, wherein said connection management unit is operable to manage connection management information including the connection ID associated with the client device and information used to determine a priority of the connection ID associated with the client device, and wherein, when receiving a command for deleting the connection ID associated with the client device, which is stored in said connection management unit, said connection management unit deletes the connection ID associated with the client device in a case where a priority of a connection ID associated with another client device sending the command is higher than the priority of the connection ID associated with the client device.

2. The AV server according to claim 1, wherein, in the case where said connection management unit creates the connection ID associated with the client device, (A) said connection management unit (i) creates the connection ID, and (ii) responds to said content data distribution unit, (B) said content data distribution unit requests said content data accumulation unit to acquire content data, and said content data accumulation unit acquires the content data, and (C) said communication unit sends the content data to the client device based on the physical connection.

3. The AV server according to claim 1, wherein, in the case where said content data distribution unit determines that a connection ID is associated with the client device, (A) said content data distribution unit requests said content data accumulation unit to acquire content data, and said content data accumulation unit acquires the content data, and (B) said communication unit sends the content data to the client device based on the physical connection.

4. The AV server according to claim 1, wherein said content data distribution unit is further operable to provide address information of the client device, which is acquired via said communication unit, to said connection management unit, and wherein said connection management unit is further operable to determine, using the address information, whether or not the client device is associated with a connection ID.

5. The AV server according to claim 4, wherein the address information is an IP address or a MAC address of the client device.

6. The AV server according to claim 1, wherein said connection management unit is further operable to manage a priority table showing a relation between address information of one or more client devices connected to said AV server, and priorities to the logical connection to be established, and wherein, when said protocol processing unit receives a command for deleting the connection ID associated with the client device which is stored in said connection management unit, said connection management unit refers to the priority table, and deletes the connection ID associated with the client device in a case where the command for deleting is made from the other client device having a higher priority.

7. The AV server according to claim 1, wherein information used to determine whether the priority of the connection ID associated with the other client device is higher than the priority of the connection ID associated with the client device is at least one of: (i) address information of a destination for establishing the logical connection; (ii) address information of a destination for establishing the physical connection; (iii) service information of the content; and (iv) priorities to the logical connection establishment assigned to the client device and the other client device.

8. The AV server according to claim 7, wherein, when receiving the command for deleting the connection ID associated with the client device, which is stored in said connection management unit, said protocol processing unit, with reference to the connection management information, does not delete the connection ID stored associated with the client device in accordance with service types associated with the connection ID associated with the client device.

9. The AV server according to claim 7, wherein, when receiving a command for browsing one or more connection IDs stored in said connection management unit from the client device via said communication unit, said protocol processing unit (i) adds the connection management information to the command, and then (ii) returns the command to the client device as a response.

10. The AV server according to claim 1, wherein, in a case where a content data distribution request has not been issued over a predetermined period of time or when a predetermined period of time has passed after the content data distribution request, said connection management unit deletes the connection ID associated with the client device.

11. The AV server according to claim 1, wherein said connection management unit is further operable to delete the connection ID associated with the client device based on address information of a destination to which no distribution request has been made.

12. The AV server according to claim 1, wherein, when receiving another content distribution request while the content distribution request is pending, said content data distribution unit determines whether or not the client device is associated with a connection ID stored in said connection management unit, and wherein, in a case where the connection ID associated with the client device has been deleted, said content data distribution unit (i) returns an error reply to the content distribution request via said communication unit, and (ii) disconnects to disconnect the connection with the client device.

13. The AV server according to claim 12, wherein said content data distribution unit determines whether or not the connection ID associated with the client device has been deleted based on address information of a distribution request destination.

14. The AV server according to claim 1,
wherein, while the content distribution request is pending, said content data distribution unit determines whether or not the client device is associated with a connection ID stored in said connection management unit, and
wherein, in a case where the connection ID associated with the client device has been deleted, said content data distribution unit disconnects the connection with the client device without distributing content via said communication unit.

15. The AV server according to claim 14,
wherein said content data distribution unit is operable to determine whether or not the connection ID associated with the client device has been deleted based on address information of a distribution request destination.

16. The AV server according to claim 1,
wherein said connection management unit is further operable to manage multiple connections with the client device.

17. A connection management method for use in an AV server, connected to a network, that distributes content to a client device requesting the content, said method comprising:
a communication step of sending and receiving a communication packet;
a content data distribution step of distributing content data to the client device in said communication step, based on a physical connection;
a content data accumulation step of accumulating the content data;
a protocol processing step of processing a command for managing a logical connection in said communication step; and
a connection management step of managing a connection with the client device based on a connection ID, the connection with the client device being based on (i) the physical connection of said content data distribution step and (ii) the logical connection of said protocol processing step,
wherein, in a case where a content data distribution request is received from the client device based on the physical connection in said communication step, said content data distribution step determines whether or not the client device is associated with a connection ID,
wherein, in a case where said content data distribution step determines that the client device is not associated with a connection ID, said connection management step creates and stores a connection ID associated with the client device,
wherein said connection management step manages connection management information including the connection ID associated with the client device and information used to determine a priority of the connection ID associated with the client device, and
wherein, when receiving a command for deleting the connection ID associated with the client device, said protocol processing step deletes the connection ID associated with the client device in a case where a priority of a connection ID associated with another client device sending the command is higher than the priority of the connection ID associated with the client device.

18. The connection management method according to claim 17,
wherein, in the case where said connection management step creates and stores the connection ID associated with the client device,
(A) said data accumulation step makes a request to acquire the content data, and said content data distribution step acquires the content data, and
(B) said communication step sends the content data to the client device based on the physical connection.

19. A non-transitory computer readable recording medium having stored thereon a program for use in an AV server, connected to a network, that distributes content to a client device requesting the content, wherein, when executed, said program causes the AV server to perform a method comprising:
a communication step of sending and receiving a communication packet;
a content data distribution step of distributing content data to the client device based on a physical connection in said communication step;
a content data accumulation step of accumulating the content data;
a protocol processing step of processing a command for managing a logical connection in said communication step; and
a connection management step of managing a connection with the client device based on a connection ID, the connection with the client device being based on (i) the physical connection of said content data distribution step and (ii) the logical connection of said protocol processing step,
wherein, in a case where a content data distribution request is received from the client device based on the physical connection in said communication step, said content distribution step determines whether or not the client device is associated with a connection ID,
wherein, in a case where said content distribution step determines that the client device is not associated with a connection ID, said management step creates and stores a connection ID associated with the client device,
wherein said connection management step manages connection management information including the connection ID associated with the client device and information used to determine a priority of the connection ID associated with the client device, and
wherein, when receiving a command for deleting the connection ID associated with the client device, said protocol processing step deletes the connection ID associated with the client device in a case where a priority of a connection ID associated with another client device sending the command is higher than the priority of the connection ID associated with the client device.

20. The non-transitory computer readable recording medium according to claim 19,
wherein, in the case where said connection management step creates and stores the connection ID associated with the client device,
(A) said data accumulation steps makes a request to acquire the content data, and said content data distribution step acquires the content data, and
(B) said communication step sends the content data to the client device based on the physical connection.

* * * * *

UNITED STATES PATENT AND TRADEMARK OFFICE
CERTIFICATE OF CORRECTION

| | | |
|---|---|---|
| PATENT NO. | : 8,001,251 B2 | |
| APPLICATION NO. | : 11/792929 | |
| DATED | : August 16, 2011 | |
| INVENTOR(S) | : Takayuki Fukui et al. | |

It is certified that error appears in the above-identified patent and that said Letters Patent is hereby corrected as shown below:

Title Page,
In section (86), line 1, change "PCT/JP2006/000757" to -- PCT/JP2006/300757 --.

Signed and Sealed this
Eighteenth Day of October, 2011

David J. Kappos
*Director of the United States Patent and Trademark Office*